Sept. 27, 1966  B. K. DAUBENSPECK  3,275,550
METHOD AND APPARATUS FOR TREATING TOILET WASTE
Filed June 28, 1963  4 Sheets-Sheet 1

INVENTOR.
BENJAMIN K. DAUBENSPECK
BY John H. Lewis Jr.
T. G. Dysart
ATTORNEYS

Sept. 27, 1966   B. K. DAUBENSPECK   3,275,550
METHOD AND APPARATUS FOR TREATING TOILET WASTE
Filed June 28, 1963   4 Sheets-Sheet 2

INVENTOR.
BENJAMIN K. DAUBENSPECK
BY John H. Lewis Jr.
T G Dysart
ATTORNEYS

Sept. 27, 1966    B. K. DAUBENSPECK    3,275,550
METHOD AND APPARATUS FOR TREATING TOILET WASTE
Filed June 28, 1963    4 Sheets-Sheet 3

INVENTOR.
BENJAMIN K. DAUBENSPECK
BY John H. Lewis Jr.
T G Dysart
ATTORNEYS 3,275,550
METHOD AND APPARATUS FOR TREATING TOILET WASTE
Benjamin K. Daubenspeck, Stratford, Conn., assignor to Remington Arms Company, Inc., Bridgeport, Conn., a corporation of Delaware
Filed June 28, 1963, Ser. No. 291,555
14 Claims. (Cl. 210—60)

This invention relates to methods and apparatus for treating toilet waste to reduce its bacteria content, and more particularly to methods and apparatus of this character adapted to be installed in boats having a marine toilet.

An increasingly serious health problem has arisen in many harbors, lakes and rivers as a result of the discharge of raw sewage from pleasure boats equipped with marine toilets. In some areas of the country the rising number of such boats has compounded the problem to such an extent that regulations have been put into effect requiring owners of boats equipped with marine toilets to install disinfecting apparatus for treating all toilet waste discharged overboard. Thus there exists a growing need for effective and relatively inexpensive apparatus capable of disinfecting toilet waste discharged from pleasure boats and the like.

Accordingly, the general object of the present invention is to provide an improved method and apparatus for effectively treating and disinfecting waste discharged from marine toilets and the like.

Another object of the invention is to provide toilet waste treating methods and apparatus capable of disinfecting all waste discharged therefrom despite periods of non-use extending for several days or longer.

Still another object of the invention is to provide improved waste treating apparatus for use with marine toilets which is sufficiently inexpensive to be within the means of the average pleasure boat owner.

Further objects and advantages of the invention will become apparent as the following description proceeds, and the novel features thereof will be pointed out with particularity in the claims which form the concluding portion of this specification.

Briefly stated, in accordance with one embodiment of the invention there is provided a waste treatment tank or chamber having an inlet adapted to be connected to a marine toilet and an outlet adapted for connection with an overboard discharge line. A rotary agitator in the tank and a pump impeller in the tank outlet are mounted on a common shaft driven by a reversible electric motor and so arranged that each performs its function as the shaft is alternately rotated in opposite directions. Suitable means for admitting a bacteria killing agent into the tank are also provided, and a sequence timer is arranged to control its operation as well as the energization and direction of rotation of the motor. In operation, waste entering the tank from the toilet is treated with bacteria killing agent, agitated and macerated, and finally pumped overboard in timed sequence.

An important feature of the improved method of treating toilet waste disclosed herein involves re-treating any waste material remaining in the discharge line of the waste treating apparatus, that is, pumping such material back into the treatment tank at the beginning of each cycle of operation. In this way unacceptable increases in the bacterial content of waste material remaining in the apparatus for relatively long periods of non-use is avoided.

For a better understanding of the present invention, reference may be made to the following description and the accompanying drawings wherein a preferred embodiment of the invention is disclosed by way of example, and wherein:

FIG. 6 is an enlarged cross-sectional view taken along the line 6—6 in FIG. 1.

Figure 1:
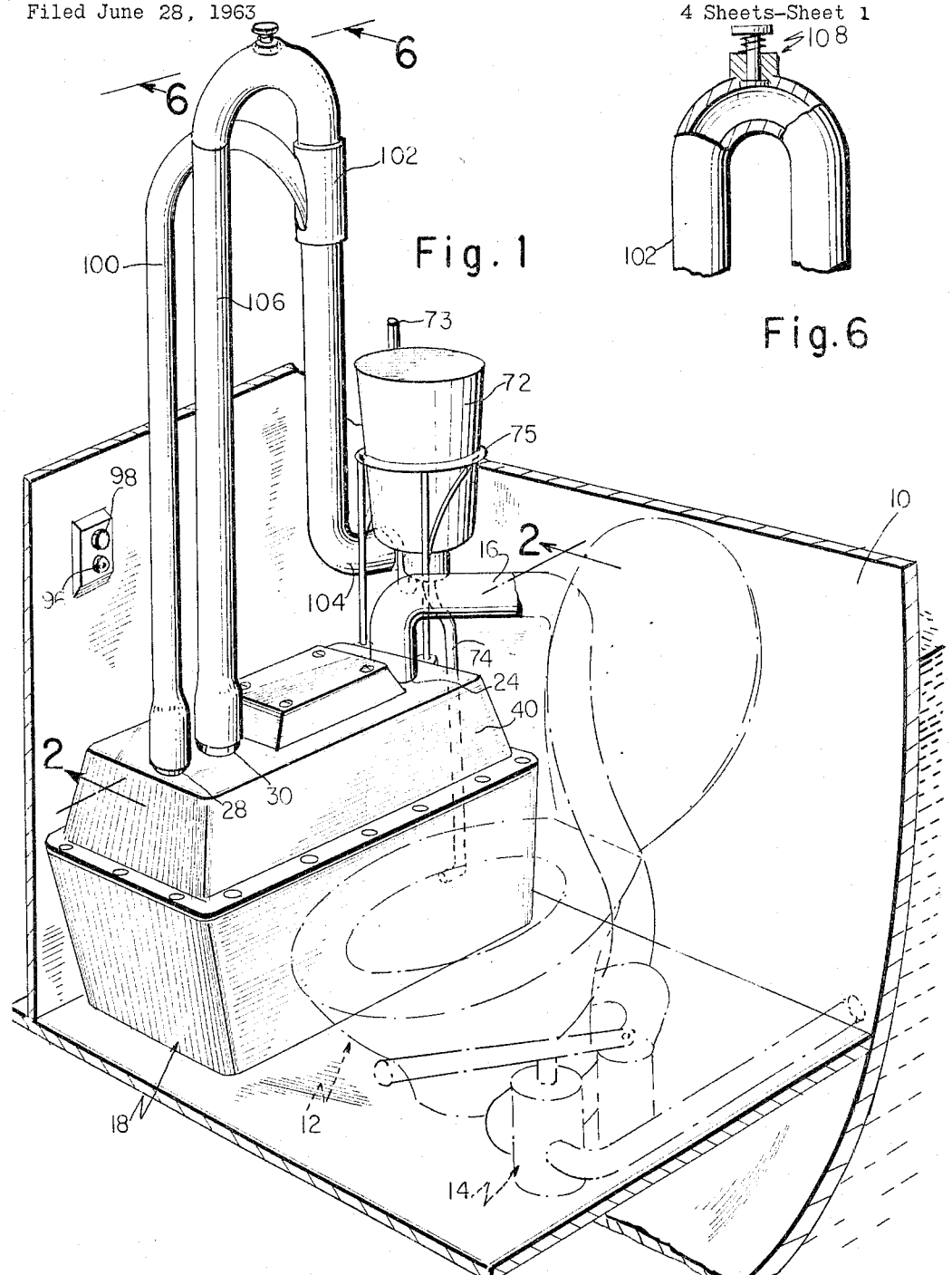
FIG. 1 is a fragmentary perspective view of a marine toilet, including waste treating apparatus embodying the invention.
Figure 2:
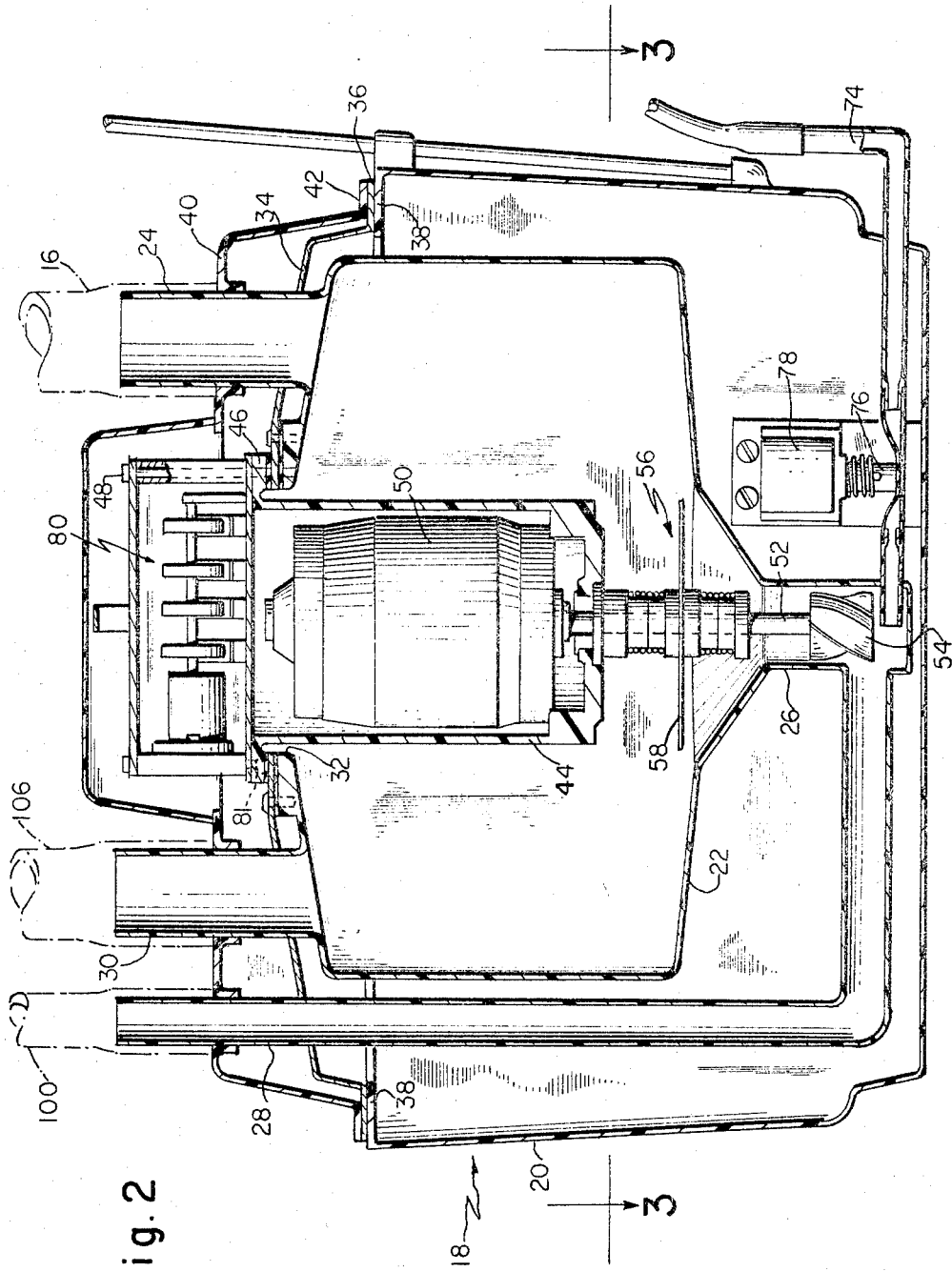
FIG. 2 is a cross-sectional view taken along the line 2—2 in FIG. 1.
Figure 3:
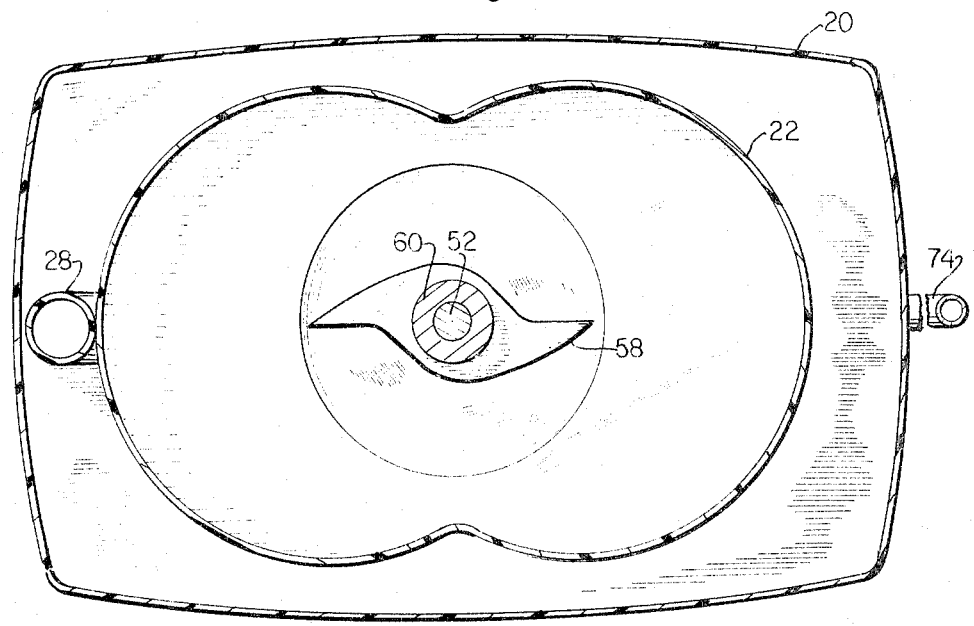
FIG. 3 is a cross-sectional view taken along the line 3—3 in FIG. 2.

Referring to the drawings, the numeral 10 designates the hull of a boat in which there is installed a marine toilet 12 of conventional design. The toilet 12 is equipped with a manually operable soil pump 14 and a discharge line 16 connected to the waste treating apparatus 18 which is mounted at the side of the toilet or in any other convenient location.

The waste-treating apparatus 18 is constructed in accordance with the present invention and comprises an outer casing 20 within which is supported a tank or chamber 22 provided with an inlet 24, a tubular outlet 26 communicating with a discharge pipe 28 and an overflow outlet 30. Preferably, both the casing and the tank are of molded plastic construction. The inlet 24 is connected to the discharge line 16 of the toilet and thus water and entrained waste material discharged from the toilet upon operation of the soil pump 14 passes into the tank 22 where it is treated to reduce its bacteria content before it is pumped overboard, all in a manner to be described.

The tank 22 is formed with a central opening 32 in its top wall and is supported within the casing 20 by means of a flanged top plate 34 having a central opening in alignment with the opening 32, and is provided with suitably located openings for receiving the inlet 24, the discharge line 28, and the overflow passage 30. The peripheral flange 36 of the top plate 34, which is preferably formed from sheet steel, is secured by screws or the like to a flanged portion 38 of the casing 20, and the portion of the top wall of the tank 22 surrounding the opening 32 is likewise secured to the adjacent portion of the top plate. Preferably, a top cover 40 having a flange 42 generally co-extensive with the flanges 36 and 38 and openings generally in alignment with the openings in the top plate 34 is also secured to the casing 20. The top cover 40, like the casing 20, may be formed of molded plastic material.

In order to provide support for motor driven agitating means within the tank 22 and pumping means within the outlet 26, a cylindrical motor housing 44 extends downwardly through the opening 32 in the tank and the mating opening in the top plate 34. The upper end of the motor housing 44 includes a flange 46 disposed in overlying relation to the top plate 34 and secured thereto by suitable fasteners such as bolts 48. Since the chamber enclosed by the walls of the tank 22 must be water-tight, sealing gaskets are positioned between the flange 46 and the top plate 34 and also between the portions of the top plate and the top wall of the tank 22 which surround the opening 32.

Mounted within motor housing 44 is a reversible electric motor 50 having a vertical shaft 52 extending through the bottom wall of the housing in axial alignment with the outlet opening 26. It will be understood that a suitable shaft seal is provided at the point where the shaft 52 passes through the motor housing 44 so that liquid within the tank 22 is prevented from entering the motor 50. The motor 50 drives a pump impeller 54 located in the tubular outlet 26 and fixedly secured to the lower end of the shaft 52 so as to discharge liquid in the tank 22 into the discharge line 28 upon rotation in the pump-out direction. Also mounted on the shaft 52 is a clutch mechanism generally designated by the numeral 56 and a rotary agitator and cutter blade 58 coupled thereto in such a manner that it is rotated with the shaft when the latter rotates in one direcion but is held stationary upon rotation of the shaft in the opposite direction. As viewed from above, looking downwardly along the axis of the shaft 52, clockwise rotation of the shaft causes the pump impeller 54 and the agitator blade 58 to rotate clockwise, the net effect being that liquid in the discharge line 28 is pumped back into the tank 22. When the shaft 52 is rotated counterclockwise the pump impeller discharges liquid from the tank into the discharge line while the agitator blade 58 is held stationary by the clutch mechanism 56. In this manner two important results are achieved. First, liquid and entrained waste material remaining in the discharge line 28 after a previous operating cycle of the appaartus are returned to the tank 22 during the period when the agitator 58 is rotating, thus preventing discharge overboard of waste material which may have remained in the discharge line long enough to permit a significant increase in its bacteria content. Second, when the pump impeller 54 functions to pump out the tank 22 its effectiveness is not impaired by rotation of the agitator 58.

Figure 4:
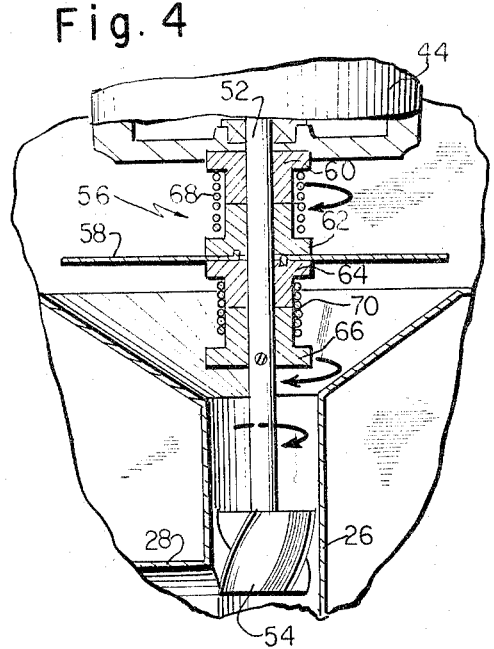
FIG. 4 is a fragmentary view of the motor shaft and related parts of the apparatus shown in FIG. 2, some of the parts being broken away to show details of construction.
Figure 5:
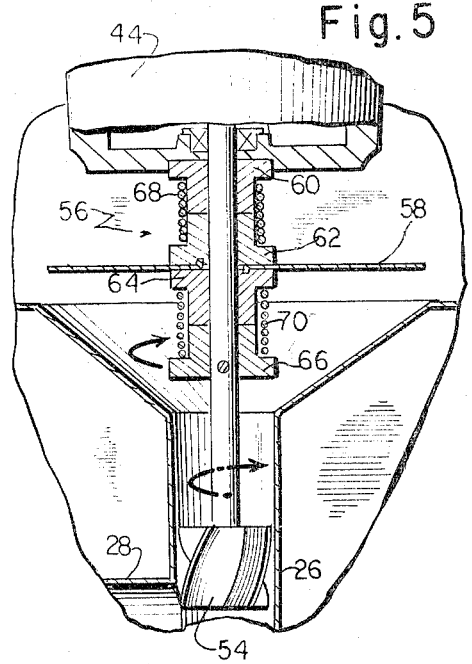
FIG. 5 is similar to FIG. 4 but shows the parts as they appear when the motor shaft rotates in a direction opposite to that shown in FIG. 4.

Referring particularly to FIGS. 4 and 5, it will be seen that clutch mechanism 56 includes a hub 60 fixedly secured to the motor housing 44, a pair of hubs 62 and 64 fixedly secured to the agitator blade 58 but capable of relative rotation with respect to the shaft 52, and a hub 66 fixedly secured to the shaft. A coil spring 68 encircling adjacent portions of the hubs 60 and 62 cooperates with these parts to form a one-way clutch and functions to lock them together upon counterlockwise rotation of the shaft 52 (see FIG. 5). Similarly, a coil spring 70 encircling adjacent portions of the hubs 64 and 66 locks these parts together upon clockwise rotation of the shaft 52 (see FIG. 4). In operation, when the shaft 52 rotates clockwise, as shown in FIG. 5, the agitator blade 58 is rotated in the same direction since the hubs 64 and 66 are locked together by the spring 70 and the hub 62 is unrestrained by the spring 68. Counterclockwise rotation of the shaft 52 reverses the gripping action of the springs 68 and 70 and, as shown in FIG. 4, the hub 66 is then free to rotate with respect to the hubs 62 and 64 which are locked to the hub 60 by the gripping action of the spring 68. Thus, upon counterclockwise rotation of the shaft 52 the agitator blade 58 is not only uncoupled from the shaft but also is held stationary to prevent any agitation of the contents of the tank 22.

For the purpose of supplying a suitable bacteria killing agent, such as a 5% solution of sodium hypochlorite, to the tank 22 at an appropriate time during each operating cycle, there is provided an inverted container 72 provided with a vent tube 73 and connected to the tank by a flexible tube 74 which in the present embodiment projects into the tubular outlet 26. The container 72 is mounted at a higher level than the apparatus 18 by means of a bracket 75 secured to the outer casing 20, so that the contents of the container may flow by gravity into the tank 22 under the control of a pinch valve 76 operated by an electric solenoid 78 mounted within the casing 20. Thus bacteria killing solution flows from the container 72 into the tank 22 each time the solenoid 78 is energized so as to allow the pinch valve 76 to open. It will be understood that the quantity of solution entering the tank 22 will be determined by the height of the container 72 in relation to the tank and the length of time the pinch valve 76 remains open. Other means for supplying bacteria killing solution to the tank 22 may also be utilized, such as a motor driven pump (not shown) arranged to deliver the solution to the tank from a reservoir mounted in any convenient location.

It is important that the motor 50 and the pinch valve solenoid 78 be energized and de-energized in a predetermined sequence in order that the method of treating waste material disclosed herein can be utilized. Accordingly, a sequence timing device generally designated by the numeral 80 connected with the motor 50 and the solenoid 78 in a suitable electrical circuit is utilized. The timer 80 is mounted on and secured to the flange 46 of the motor housing 44 by suitable means, such as a plurality of screws 81. The timer is of a well-known type, i.e., one including a plurality of switches actuated by rotary cams driven by a small electric motor, and is not disclosed in detail herein since its specific construction is not a part of the present invention. However, suitable electrical circuitry and components are schematically illustrated in the wiring diagram of FIG. 7.

Figure 7:
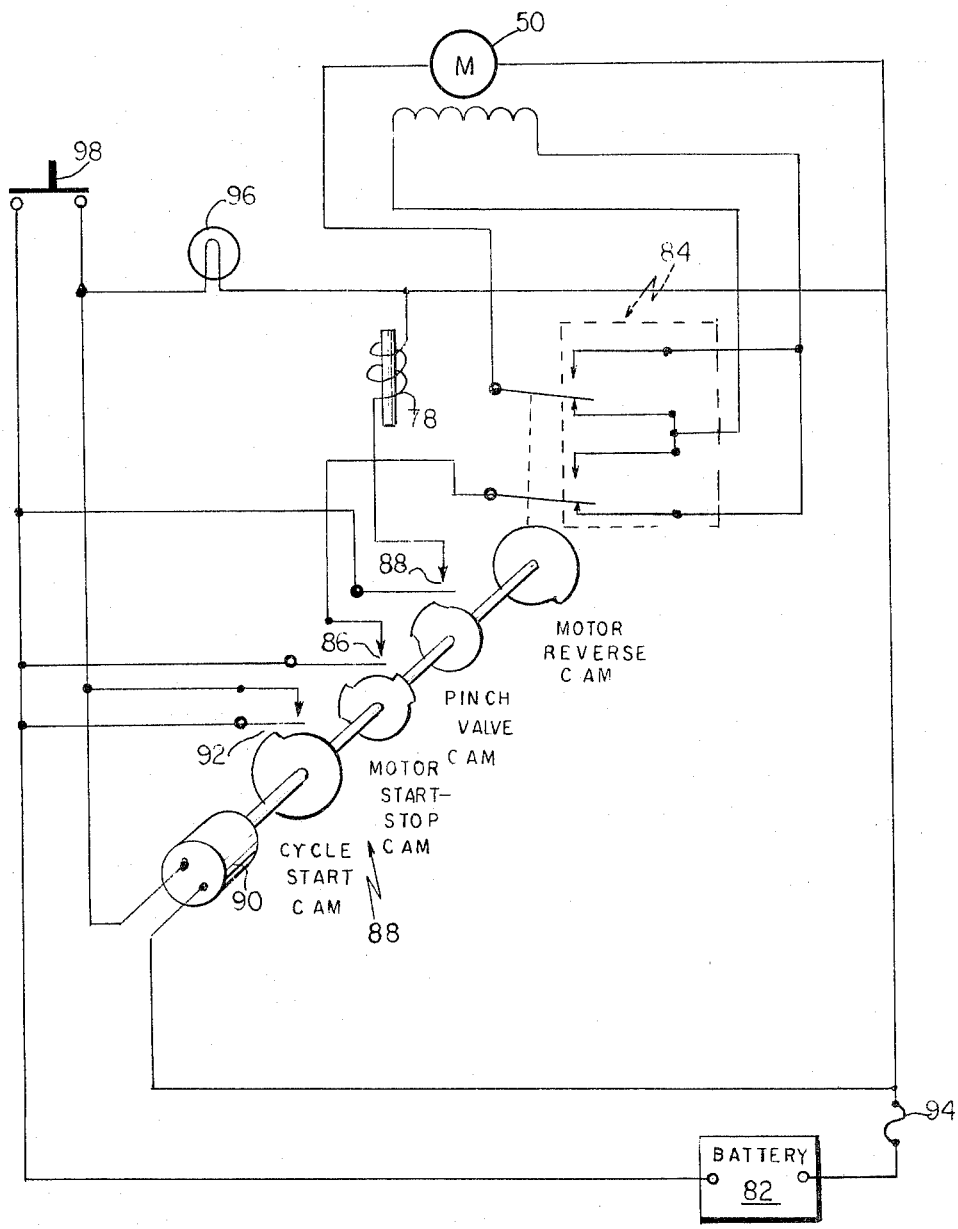
FIG. 7 is a schematic wiring diagram of the electrical components of the apparatus disclosed herein.

As shown in FIG. 7, the electrical system of the apparatus disclosed herein includes the reversible series motor 50 which may be energized from a source of direct current 82, such as a battery, through a double pole double throw reversing switch 84 and a timer operated control switch 86. The electrical system also includes the pinch valve solenoid 78 connected to the battery 82 through a timer operated switch 88 and a timer motor 90 which is energized by the battery whenever still another timer operated switch 92 is closed. Other components of the electrical system include a fuse 94, a pilot light 96 which remains on during the operating cycle of the apparatus, and a manually operable normally open starting switch 98 connected in parallel with the timer operated switch 92. The pilot light 96 and the starting switch 98 may be mounted in any convenient location in the vicinity of the toilet 12, as shown in FIG. 1.

The operating cycle of the apparatus 18 may be initiated by manually closing switch 98, whereupon the timer motor 90 is energized and promptly closes the timer switch 92. As soon as the switch 92 closes the switch 98 may be released, the operative condition of the system being indicated by the energization of the pilot light 96. It will be understood that operation of the apparatus 18 will be initiated after liquid and waste material have been pumped by means of the soil pump 14 from the toilet 12 into the tank 22, and that after switch 92 closes the operating cycle of the apparatus 18 will continue to completion without further attention from the operator.

The motor reversing switch 84 is initially conditioned to drive the motor 50 in the previously described clockwise direction, that is, in a direction which causes rotation of the agitator blade 58 as well as the pump impeller 54. This action is initiated by closure of timer operated switch 86 and continues for a short period of time, for example, a period of thirty seconds. The switch 88 is also closed for a short interval and then re-opened at the beginning of this period so as to open the pinch valve 76 and permit the introduction into the tank 22 of a suitable quantity of bacteria treating agent. In this manner material in the tubular outlet 26 and the discharge line 28, including the bacteria treating agent, is thoroughly mixed with the contents of the tank 22 and any solids therein are reduced to small particle size.

Thereafter the switch 86 in the motor circuit is opened for a period of approximately three minutes to permit the bacteria treating agent to act upon the waste material in the tank 22 while the tank's contents remain quiescent. At the end of this period the motor 50 is again energized to rotate both the pump impeller 54 and the agitator 58 for a short interval, i.e., a few seconds, in order to thoroughly mix any foam which may have accumulated in the tank 22 with the remainder of the contents of the tank. The motor reversing switch 84 is then actuated and the pump impeller 54 alone is rotated in the reverse or counterclockwise direction whereupon the contents of the tank 22 are pumped into the discharge line 28 and thence overboard. The motor 50 is then de-energized by the timer, and the motor reversing switch 84 is actuated to its initial position in order to condition the system for the next cycle of operation. Finally, the cycle starting switch of the timer is opened, thus de-energizing all circuits of the system.

In normal operation the waste material is pumped out of the tank 22 through discharge line 28 into a connecting line 100 secured thereto and extending upwardly to a pipe fitting 102 which in turn is connected to an overboard discharge pipe 104. However, in order to permit use of the toilet 12 if the motor 50 should fail to operate for any reason, there is provided an alternate discharge line 106 connected at its lower end to the outlet opening 30 of the tank 22 and at its upper end to the pipe fitting 102. The upper portion of the pipe fitting 102 is U-shaped and, as shown in FIG. 6, is provided with an air inlet valve 108 which allows air to enter the tank 22 by way of the discharge line 106 during normal pump-out operations.

While a particular embodiment of the present invention has been disclosed herein, it is to be understood that the invention is not limited to this specific construction, and it is intended that the appended claims cover all modifications within the true spirit and scope of the invention.

What is claimed is:

1. Waste treating apparatus for toilets comprising a waste receiving chamber having inlet and outlet means, a rotatable agitator in said chamber, a pump impeller in the said outlet opening, reversible motor driven means connected to said impeller and said agitator for selectively rotating in first one direction the said impeller while maintaining the said agitator motionless so as to pump fluids out of said chamber and then rotating the said impeller in a direction opposite to the said first one direction and clutch means for connecting said reversible motor driven means in driving engagement with said agitator when said impeller is rotated in said opposite direction.

2. Waste treating apparatus for toilets comprising a waste receiving chamber having inlet and outlet openings, means for delivering waste treating material to said camber, a rotatable agitator in said chamber, a pump impeller in said outlet opening, reversible motor driven means connected to said impeller and said agitator for selectively rotating said impeller first in one direction so as to pump fluids out of said chamber, and then rotating said impeller in a direction opposite to said first one direction so that said impeller is inoperative to pump fluids out of said chamber, clutch means for connecting said reversible motor driven means in driving engagement wtih said agitator only when said impeller is rotated in said opposite direction and brake means for retarding movement of said agitator when said impeller is rotated in said first one direction.

3. Waste treating apparatus as defined in claim 1 in which the pumping action of said agitator and said impeller when rotating in said opposite direction is sufficient to return fluid in said outlet opening to said chamber.

4. Waste treating apparatus for toilets comprising a waste receiving chamber having inlet and outlet openings, a rotatable shaft mounted in said chamber, agitator means within said chamber carried by said shaft, clutch means for rotating said agitator means when said shaft is rotated in one direction and for holding said agitator means stationary when said shaft is rotated in the opposite direction, a pump impeller secured to said shaft and located in said outlet opening, said impeller being arranged to discharge the contents of said chamber through said outlet opening upon rotation of said shaft in said opposite direction, and a reversible motor connected in driving engagement with said shaft.

5. Waste treating apparatus as defined in claim 4 in which the pumping action of said agitator and said impeller when rotating in said one direction is sufficient to return fluid in said outlet opening to said chamber.

6. Waste treating apparatus as defined in claim 4 including a control circuit and a timer for energizing and reversing said motor in a predetermined sequence.

7. Waste treating apparatus for toilets comprising a waste receiving chamber having an inlet opening and an outlet opening, said outlet opening being located at the bottom of said chamber and including a downwardly extending tubular portion communicating with a discharge pipe, means for introducing a predetermined quantity of waste treating material into said chamber, a rotatable shaft vertically disposed in said chamber in coaxial relation with said tubular portion, agitator means within said chamber carried by said shaft, clutch means for rotating said agitator means when said shaft is rotated in one direction and for holding said agitator means stationary when said shaft is rotated in the opposite direction, a pump impeller secured to said shaft and located in said tubular portion, said impeller being arranged to discharge the contents of said chamber through said outlet opening into said discharge pipe upon rotation of said shaft in said opposite direction, and a reversible motor connected in driving engagement wtih said shaft.

8. Waste treating apparatus as defined in claim 7 in which the pumping action of said agitator means and said impeller when rotating in said one direction is sufficient to return fluid in said discharge pipe to said chamber.

9. Waste treating apparatus as defined in claim 7 including a control circuit and a timer for energizing said introducing means and for energizing and reversing said motor in a predetermined sequence.

10. Waste treating apparatus for toilets comprising a waste receiving chamber having an inlet opening and an outlet opening, said outlet opening being located at the bottom of said chamber and including a downwardly extending tubular portion, a discharge pipe connected to said tubular portion, means for introducing a predetermined quantity of waste treating material into said chamber, a rotatable shaft vertically disposed in said chamber in coaxial relation with said tubular portion, a rotary agitator within said chamber carried by said shaft, a first one-way clutch adapted to engage said agitator and said shaft for rotation in one direction, a second one-way clutch adapted to hold said agitator stationary when said shaft is rotated in the opposite direction, a pump impeller secured to said shaft and located in said tubular portion, the configuration of said agitator and said pump impeller being such that when said shaft rotates in said one direction fluid in said discharge pipe is returned to said chamber, said impeller being arranged to discharge the contents of said chamber through said outlet opening into said discharge pipe upon rotation of said shaft in said opposite direction, a reversible motor connected in driving engagement with said shaft, and control means including a sequence timer and a control circuit for energizing said introducing means and for energizing and reversing said motor in a predetermined sequence.

11. A method of treating waste deposited in marine toilets and the like comprising the steps of pumping a mixture of waste and water from the toilet to a chamber having a discharge pipe connected thereto, introducing a predetermined quantity of waste treating material to the chamber, pumping any material in said discharge pipe back into said chamber, agitating the contents of said chamber, allowing the contents of said chamber to remain in a quiescent state for a period of time sufficient to permit said waste treating material to substantially reduce the bacteria count of said waste, and thereafter discharging the mixture into said discharge pipe.

12. A method of treating waste deposited in marine toilets and the like comprising the steps of pumping a mixture of waste and water from the toilet to a chamber having a discharge pipe connected thereto, introducing a predetermined quantity of sewage treating material to the chamber, agitating the mixture for a period of approximately thirty seconds and simultaneously pumping any material in the discharge pipe back into said chamber, allowing the mixture to remain in a quiescent state for approximately three minutes and thereafter discharging the mixture into the discharge pipe.

13. A method of treating waste deposited in marine toilets and the like comprising the steps of pumping a mixture of waste and water from the toilet to a chamber having a discharge pipe connected thereto, introducing a predetermined quantity of waste treating material to the chamber, agitating the contents of said chamber, allowing the contents of said chamber to remain in a quiescent state for a period of time sufficient to permit said waste treating material to substantially reduce the bacteria count of said waste, re-agitating the contents of said chamber to mix any foam therein with the remainder of said contents, and thereafter discharging the mixture into said discharge pipe 14. A method of treating waste deposited in marine toilets and the like comprising the steps of pumping a mixture of waste and water from the toilet to a chamber having a discharge pipe connected thereto, introducing a predetermined quantity of sewage treating material to the chamber, agitating the mixture for a period of approximately thirty seconds and simultaneously pumping any material in the discharge pipe back into said chamber, allowing the mixture to remain in a quiescent state for approximately three minutes, re-agitating the mixture for a period of approximately five seconds, and thereafter discharging the mixture into the discharge pipe.

References Cited by the Examiner

UNITED STATES PATENTS

| | | | |
|---|---|---|---|
| 2,109,680 | 5/1955 | Watson | 210—97 |
| 2,777,816 | 1/1957 | Schumacker et al. | |
| 3,094,707 | 6/1963 | Fleming | 4—77 |
| 3,154,795 | 11/1964 | Burn | 4—77 |

OTHER REFERENCES

Sewage and Industrial Wastes, vol. 28, No. 1, January-June 1956 (pp. 93–99).

MORRIS O. WOLK, *Primary Examiner.*

E. G. WHITBY, *Assistant Examiner.*